April 14, 1970   A. R. GOELLNER   3,505,868
VIEWING DEVICE FOR LIQUID LEVEL GAGES
Filed Nov. 8, 1967
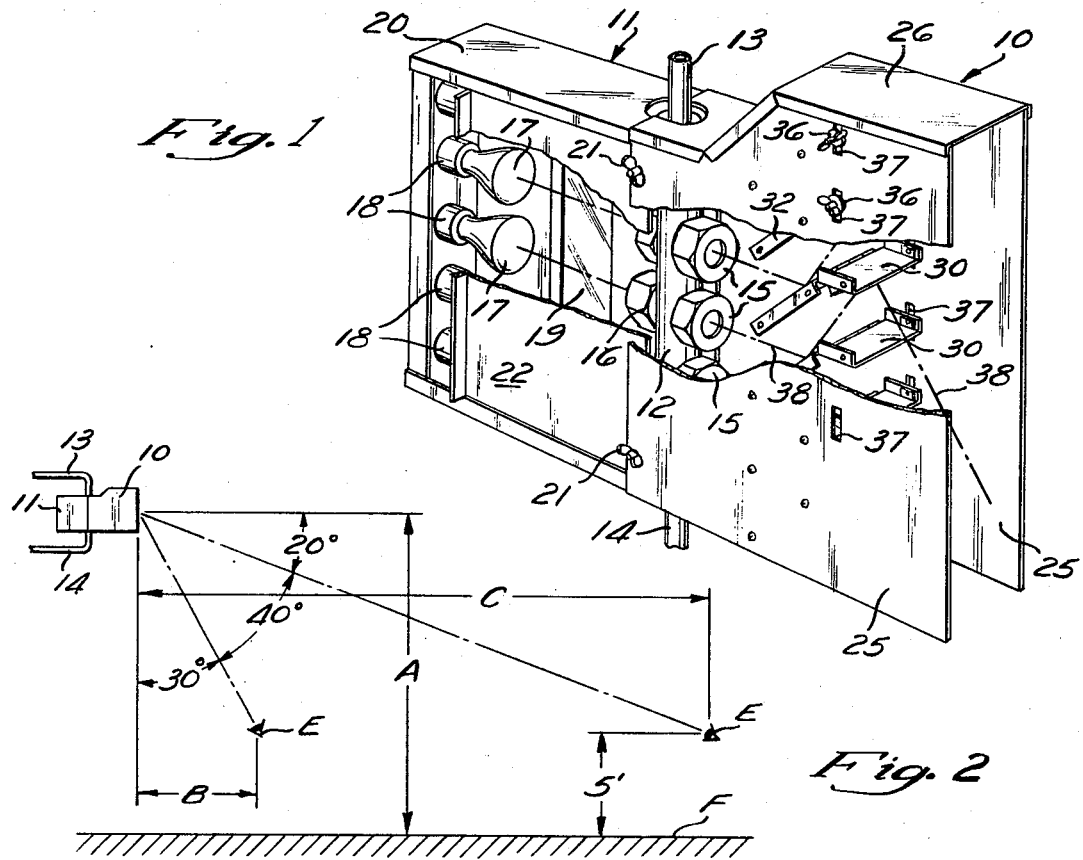
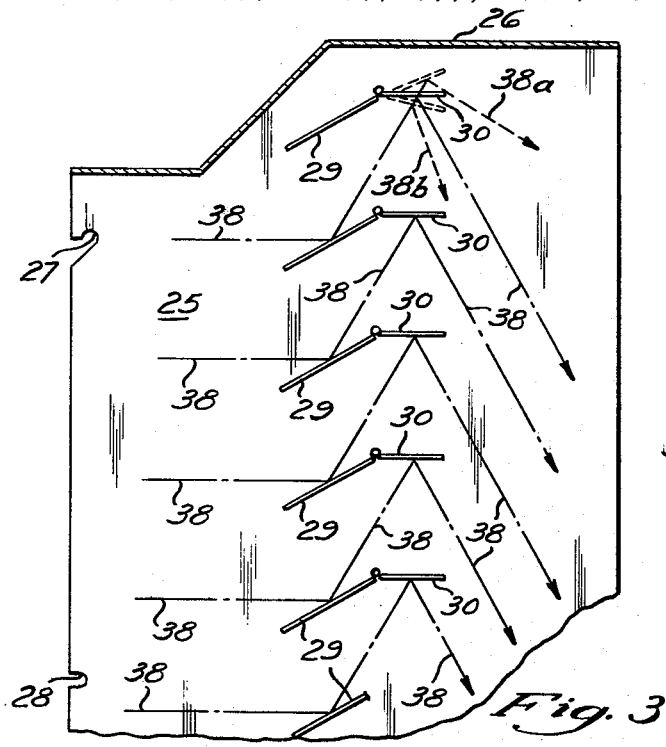
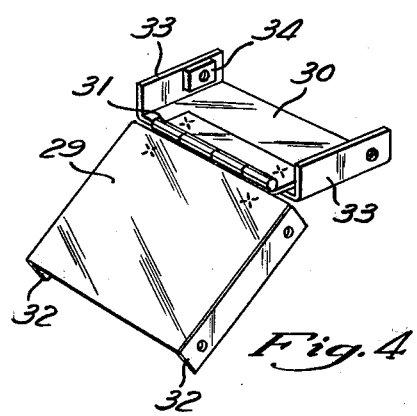
INVENTOR.
ALLAN R. GOELLNER
BY Bosworth, Sessions,
Herrstrom & Cain
ATTORNEYS

United States Patent Office 3,505,868
Patented Apr. 14, 1970

3,505,868
VIEWING DEVICE FOR LIQUID LEVEL GAGES
Allan R. Goellner, Parma Heights, Ohio, assignor to The Clark-Reliance Corp., Cleveland, Ohio, a corporation of Ohio
Filed Nov. 8, 1967, Ser. No. 681,400
Int. Cl. G01f 23/02
U.S. Cl. 73—293                                                7 Claims

ABSTRACT OF THE DISCLOSURE

A viewing device for liquid level gages of the type having small ports through which light is projected through filters so that the ports show one color, such as green, where a liquid is present behind the ports and another color, such as red, where a gas is present. The apparatus comprises a hood containing a system of mirrors mounted adjacent to the ports of the gage and arranged so that the ports can be observed from a convenient location even though the gage itself may be many feet away.

BACKGROUND OF THE INVENTION

This invention relates to a viewing device for liquid level gages of the type embodying a series of vertically arranged ports that are illuminated through a system of filters so that the ports present one color where a liquid is behind them and another color where a gas is behind them. The invention is described herein as applied to boiler water level gages but it is to be understood that it may be used with vessels containing other liquids and associated gases. Gages of this general type are well known, one such gage being disclosed in United States Patent No. 3,187,573, issued June 8, 1965.

The present invention relates to a viewing device that is mounted adjacent the gage and that enables the gage to be read easily from a location on the operating floor of the boiler room even though the gage itself may be many feet away. The nature of water level gages of this type is such that the light traveling from the light source through the ports is emitted in rather narrow beams so that unless additional equipment is supplied, the viewer's eye must be at approximately the same level as the gage and generally in alignment with the beams of light emitted from the gage ports. In many installations this presents a problem. With large boilers the gage may be many feet above the operating floor, in which case the gage must be viewed from a balcony or ladder, or through an arrangement in the nature of a periscope embodying a mirror disposed adjacent the gage and a mirror on the boiler room operating floor.

To require the operator to ascend to a balcony or climb a ladder to view a gage is obviously unsatisfactory. The periscope arrangements have also been unsatisfactory because the positioning of a mirror on the boiler floor beneath the gages is sometimes difficult; the mirrors become dirty and frequently the operating floor is cluttered so that the mirror itself cannot conveniently be observed.

It has also been proposed to diffuse the light beams emitted from the ports as by ground glass or beehive type lenses, but this is unsatisfactory because the intensity of the light emitted is greatly diminished and the existing level of illumination in the boiler room often makes it difficult to observe the different colors of the illuminated ports.

SUMMARY

A general object of the present invention is to provide a viewing apparatus for boiler water and other liquid level gages of the type indicated in which the difficulties noted above are eliminated and by means of which an operator on the boiler room floor can readily observe and accurately read the gage even though the surrounding level of illumination may be high.

Briefly, I accomplish these and other objects of the invention by the provision of a system of mirrors, preferably enclosed within a hood, that is arranged to deflect the light beams emitted from the several ports of the gage downwardly at an acute angle to the vertical to a predetermined location so that an operator only has to go to the predetermined location on the operating floor and glance upwardly to read the gage. The mirrors are adjustable so that the viewing point can be varied within limits and a convenient location selected, and all of the equipment is mounted adjacent the gage and is preferably shielded by a hood so that the equipment is out of the way, remains reasonably clean and is clearly visible even though the level of illumination in the boiler room may be rather high.

BRIEF DESCRIPTION OF THE DRAWING

Referring to the drawings—

FIGURE 1 is a perspective, with parts broken away, illustrating a viewing device embodying the present invention, associated with the gage of the type indicated.

FIGURE 2 diagrammatically illustrates a gage embodying the viewing device of the present invention in a boiler room and shows the range of viewing locations for which the device may be adjusted.

FIGURE 3 is a partial vertical sectional view of the gage illustrated in FIGURE 1, and FIGURE 4 is a perspective showing one of the mirror assemblies used in the device.

DESCRIPTION OF THE PREFERRED EMBODIMENT

In FIGURE 1 of the drawing, a viewing device embodying a preferred form of the invention is shown in general at 10 in association with a gage 11 of the type mentioned above and preferably as illustrated in the above-mentioned Patent No. 3,187,573. Gage 11 comprises a water or liquid column 12 connected by suitable conduits 13 and 14 to the boiler or other vessel with which the gage is associated. As described in the aforesaid patent, the water column has a series of vertically aligned ports 15, each embodying a transparent disc. Opposite each port 15 there is a generally similar port 16, also embodying a transparent disc. Light is projected toward the ports 16, preferably by a series of electric lamps 17 carried by sockets 18, there being one lamp 17 for each pair of ports 15 and 16. Filters 19 are interposed between the lamps and the ports 16. The arrangement, as explained in the aforesaid patent, is such that with a gage associated with a steam boiler, where water is present in the water column 12 behind a port 15, or portion thereof, the light emitted is of one color, for example, green, and where steam is behind a port 15 or portion thereof, the light emitted is another coler, for example, red.

The lamps 17, sockets 18, water column 12, ports 15 and 16, and filters 19 are all enclosed within a sheet metal housing 20, which is supported as by screws 21 from the water column, other similar screws being on the opposite side of the housing. The housing preferably is rectangular as shown and preferably has a removable panel 22 to give access to the lamps, the water column and the ports. These parts per se form no part of the present invention.

It will be evident from the arrangement of the parts and from the path that the light from the lamps 17 must take through the ports 15 and 16 and the water column that the light is emitted from the ports 15 in a rather narrow beam and that in order for an observer to read the gage 11 itself correctly, particularly if the boiler room is well lighted, it would be necessary for the observer to station himself so that his eyes would be in reasonably close vertical and horizontal alignment with the axes of the light beams projected from the ports 15. The viewing device 10 of the present invention makes it possible for the gage to be read accurately and without difficulty from the operating floor of the boiler room, even though the gage and viewing device themselves may be so high above the floor, for example, ten to forty feet, that an operator standing on the floor could not read the gage.

According to the present invention, this result is accomplished by means of a system of mirrors, including two mirrors for each port 15 with one of the mirrors being adjustable so that the beams of light emitted from the ports 15 can be directed downwardly at an angle to the vertical to a location on the operating floor where the beams can be easily viewed by an operator. As shown in FIGURES 2 and 3, the viewing device comprises a hood that is preferably formed of sheet metal and has sidewalls 25 and a top 26 secured to the side walls. The hood is shown as being bottomless but a bottom may be supplied if desired. The hood is secured in alignment with the gage housing 20 and it is preferably mounted by means of the screws 21 that support the housing 20, the screws 21 engaging appropriate notches 27 and 28 in the side walls 25.

In order to reflect the light downwardly to the desired location, a series of mirror assemblies, each comprising a fixed mirror 29 having its upper surface reflective and an adjustable mirror 30 having its lower surface reflective, are mounted in the hood. Preferably, the mirrors 29 and 30 are hinged together by a hinge 31 as shown in FIGURE 4 and are composed of metal with reflective surfaces provided by polished electroplated surfaces. The fixed mirrors 29 have flanges 32 for securing them to the sidewalls 25 as by screws, while the adjustable mirrors 30 have flanges 33 provided with nuts 34 welded to them so that the position of the adjustable mirrors can be adjusted and the mirrors held in adjusted position by means of the screws 36 that extend through slots 37 in the sidewalls 25.

The beams of light from the gage are indicated in broken lines 38 in FIGURES 1 and 3. It will be seen that the beam from each port 15 strikes the upper surface of one of the mirrors 29 and is reflected upwardly at an obtuse angle to its original path. Each beam is then reflected downwardly from the reflective undersurface of an adjustable mirror 30 into a path as indicated by the broken line that extends downwardly at an acute angle to the vertical toward the operating floor of the boiler room. It will be evident that by adjusting the position of the mirrors 30 the location where the gage can be readily observed by an operator standing on the boiler room floor can be controlled. The range of adjustment of the uppermost beam is indicated by the dash lines 38a and 38b and the dotted positions of the uppermost mirror 30 in FIGURE 3.

The other mirrors 30 are also adjustable through a similar range. The range of viewing station locations possible with the preferred range of adjustment is shown in FIGURE 2. As there indicated, the preferred range of adjustment is through about forty degrees, from a position where the beams project downwardly at an angle of about twenty degrees from the horizontal to a position where they project downwardly at an angle of about sixty degrees to the horizontal. The table given below shows the range of viewing locations possible with this amount of adjustment for various elevations of the gage 11 above the floor F, assuming the observer's eye E to be 5 feet above the floor.

| Elevation (ft.) of gage above operating floor | Horizontal distance (ft.) between observer and gage | |
|---|---|---|
| A | B (min.) | C (max.) |
| 10 | 2½ | 13½ |
| 12 | 3½ | 18½ |
| 14 | 4½ | 23½ |
| 16 | 5 | 29 |
| 18 | 6 | 35 |
| 20 | 7 | 40 |
| 25 | 9 | 53 |
| 30 | 11 | 67 |
| 35 | 13 | 80 |
| 40 | 16 | 93 |

It will be noted that a substantial range of adjustment is provided from a minimum horizontal distance of two and one-half feet between the observer and the gage for a gage that is mounted ten feet above the operating floor to a maximum of ninety-three feet for a gage that is mounted forty feet above the operating floor. Thus it is possible to selected a convenient location on the floor to which an operator can go to observe the gage without obstruction and without requiring any apparatus on the operating floor.

The proper adjustment of the gage can be effected easily by positioning one operator at the desired location for observation on the operating floor and another operator on a ladder or elevated platform adjacent to the gage. The wing screws for the adjustable mirrors are all loosened and the lowest adjustable mirror 30 is then adjusted by means of one of the wing screws 36 to the position where the lowest gage port 15 appears brightest to the eye of the operator. Then the wing screws are tightened, care being taken not to change the adjusted position of the moveable mirror. The next lowest mirror is then adjusted in the same manner and the procedure is repeated until all of the moveable mirrors have been correctly adjusted to give the best view to an observer standing in the selected location. In correct adjustment, the beams from individual ports will approximately converge at the viewing point; i.e., at the observer's eyes.

Once the adjustment has been made the gage can be read easily simply by the operator going to the selected location and glancing upwardly at the gage. Since the mirrors are enclosed in a hood and since there is no substantial diffusion of the light beams emitted from the gage ports 15 the beams emitted from the ports appear substantially as bright to the operator as if he viewed them directly from a position in horizontal and vertical alignment with the ports. No maintenance is required except occasional cleaning which can be carried out simply by wiping clean the top surface of each stationary reflector and the underside of each moveable reflector. The ports and lamps should also be kept clean as in the case with any gage of this type.

From the foregoing it will be seen that the invention provides a simple and relatively inexpensive viewing device particularly adapted to liquid level gages of the type embodying a series of ports that emit a light beam of one color when a liquid is behind the port and of another color when a gas is behind the port. The device requires no maintenance other than periodic cleaning. There is no obstruction on the operating floor. Since the device is enclosed in a hood and located at an elevated position it remains clean for relatively long periods of time, and because of its elevated position obstructions and clutter on the operating floor do not interfere with observation of the gage.

Those skilled in the art will appreciate that various changes and modifications can be made in the invention without departing from the spirit and scope thereof.

I claim:
1. A viewing device for a liquid level gage of the type embodying a vertical liquid column having a series of vertically aligned transparent ports through which light is emitted in generally horizontal directions, the light beams being of one color where a liquid is behind the ports and another color where a gas is behind the ports, said viewing device being adapted to be disposed adjacent the gage and comprising a first mirror and a second mirror associated with each port, said first mirror being adjacent said gage and said second mirror being adjacent said first mirror, each first mirror being adapted to reflect light emitted from the port with which it is associated at an angle to the horizontal and each second mirror being disposed in the path of light reflected by the first mirror and positioned to direct the light at an acute angle to the vertical to a viewing point spaced horizontally and vertically from the gage and the viewing device, and a housing having top and side walls providing a hood to shelter said mirrors from dirt and light.

2. A viewing device according to claim 1 wherein the mirrors are mounted in said housing, said housing having opaque top and side walls and being adapted to be mounted on the gage, the housing projecting away from the gage beyond the second mirrors to provide the hood to shelter the mirrors from dirt and light.

3. A viewing device according to claim 1 wherein the first mirrors are mounted in fixed positions and the second mirrors are adjustable, whereby the location of the viewing point can be varied.

4. A viewing device according to claim 3 wherein the second mirrors are independently adjustable, whereby the beams from the ports can be caused substantially to converge at the viewing point.

5. A viewing device according to claim 1 wherein the first mirrors are disposed in parallel planes, one above the other, in a column, each first mirror being disposed at an angle to the horizontal to reflect the light emitted from the port with which it is associated upwardly from the upper surface thereof to one of the second mirrors, and wherein the second mirrors are disposed one above the other in a column, each second mirror being adapted to reflect light reflected to it by a first mirror downwardly from its under side to the viewing point.

6. A viewing device according to claim 5 wherein the mirrors are mounted in a housing having opaque top and side walls, the first mirrors being supported in fixed positions in the housing and the second mirrors being hinged to the first mirrors.

7. In combination with a boiler water level gage of the type embodying a vertical water column having a series of vertically aligned transparent ports through which light is emitted in generally horizontal directions, the light beams being of one color where water is behind the ports and another color where steam is behind the ports, the gage being mounted on the boiler at a substantial distance above the operating floor of the boiler room, said viewing device comprising a housing mounted on the gage and having opaque top and side walls, a set of first mirrors disposed in parallel planes, in a column, said first mirrors being supported by said housing in fixed positions, a set of second mirrors disposed one above the other in a column, said second mirrors being supported in said housing and being hinged to the first mirrors, each first mirror being disposed at an angle to the horizontal to reflect the light emitted from the port with which it is associated upwardly from its upper surface to one of the second mirrors and being disposed at substantially the same level as the port with which it is associated, each second mirror being disposed adjacent a first mirror to reflect light reflected to it by the adjacent first mirror downwardly at an angle to the vertical from its under side to a viewing point below the gage and horizontally spaced from the boiler and the viewing device and convenient to an observer on the operating floor, the positions of the second mirrors being independently adjustable whereby the location of the viewing point can be varied and the light beams from the ports can be caused substantially to converge at the veiwing point, the housing projecting away from the gage beyond the second mirrors to provide a hood to shelter the mirrors from dirt and light.

References Cited

UNITED STATES PATENTS

| | | | |
|---|---|---|---|
| 666,154 | 1/1901 | Reed | 73—293 |
| 1,737,126 | 11/1929 | Reyling et al. | |
| 2,302,952 | 11/1942 | Pfeifer | 350—304 X |
| 2,547,731 | 4/1951 | Bailey | 73—327 X |
| 2,949,777 | 8/1960 | Ferron | 73—293 X |
| 3,187,573 | 6/1965 | Goellner | 73—329 |
| 3,370,469 | 2/1968 | Mackenzie | 73—331 |
| 3,375,753 | 4/1968 | Ramsell | 350—299 X |

LOUIS R. PRINCE, Primary Examiner

D. M. YASICH, Assistant Examiner

U.S. Cl. X.R.

73—327; 350—304